Patented July 5, 1938

2,122,798

UNITED STATES PATENT OFFICE 2,122,798

ACID DYESTUFFS OF THE ANTHRAQUINONE SERIES CAPABLE OF BEING CHROMED

Georg Kränzlein and Ernst Diefenbach, Frankfort-on-the-Main, Erich Fischer, Bad Soden-on-the-Taunus, Ernst Honold, Fritz Eggert, and Helmut Krauss, Frankfort-on-the-Main, Germany, assignors to General Aniline Works, Inc., New York, N. Y., a corporation of Delaware No Drawing. Application December 17, 1935, Serial No. 54,940. Renewed August 26, 1937. In Germany December 22, 1934

5 Claims. (Cl. 260—59)

The present invention relates to acid dyestuffs of the anthraquinone series capable of being chromed.

We have found that acid dyestuffs of the anthraquinone series capable of being chromed and having good properties of fastness are obtainable by condensing an alpha-halogen-anthraquinone sulfonic acid or a substitution product thereof, advantageously in the presence of copper or a copper salt and an acid binding agent, with an amino - aryl - ortho - hydroxycarboxylic acid, a homologue or a derivative thereof and, if desired, introducing further sulfo-groups into the condensation product thus obtained by treating it with a sulfonating agent.

The new dyestuffs may also be obtained by using an alpha-halogen-anthraquinone or a substitution product thereof containing, for instance, in the 2-position a further halogen atom which is exchangeable for the sulfo-group, and condensing it first with an amino-aryl-ortho-hydroxycarboxylic acid, a homologue or a derivative thereof and then exchanging in known manner the halogen atom for the sulfo-group.

The dyestuffs are new. There are, for instance, obtained anthraquinone dyestuffs which contain in a beta-position of the anthraquinone molecule a sulfonic acid group and in an alpha-position of the anthraquinone molecule an —NH—R group wherein R means an aromatic radical containing a benzene nucleus with a carboxy and a hydroxy group in ortho-positions to each other, and the salts of these compounds. They yield, when after-chromed, chromium lakes of very good properties of fastness. The dyeings obtained, for instance, on wool and treated with an agent yielding chromium are distinguished by a very good fastness to washing, fulling and light.

The following examples serve to illustrate the invention, but they are not intended to limit it thereto; the parts are by weight.

| | Parts |
|---|---|
| (1) 1,5 - dihydroxy - 4,8 - dibrom - anthra - quinone-2,6-disodium-sulfonate | 11.5 |
| 2-hydroxy-5-aminobenzoic acid | 8 |
| Calcined sodium carbonate | 1.5 |
| Sodium bicarbonate | 6 |
| Cuprous chloride | 0.5 | are together stirred for 20 hours at 60° C. to 65° C. in 150 parts of water. The whole is then diluted with 1500 parts of water, heated to boiling and the solution obtained is filtered. After addition of sodium chloride to the filtrate the latter is acidified with dilute hydrochloric acid. The dyestuff which has separated is filtered with suction and, for further purification, may be dissolved in and reprecipitated from dilute sodium carbonate solution. There is obtained a dyestuff which dyes wool, when after-chromed, green tints of good fastness to washing, fulling and light.

(2) By using in Example 1 instead of the 2-hydroxy-5-aminobenzoic acid, the 2-hydroxy-4-aminobenzoic acid, a dyestuff is obtained which is very similar to that described in Example 1 and has similarly good properties of fastness.

| | Parts |
|---|---|
| (3) 1,5 - dihydroxy - 4,8 - dibrom - anthra - quinone-2,6-disodium-sulfonate | 12 |
| 2 - hydroxy - 5 - (meta-aminobenzoyl) - aminobenzoic acid | 14 |
| Calcined sodium carbonate | 6 |
| Sodium bicarbonate | 8 |
| Cuprous chloride | 0.8 | are together stirred in 350 parts of water at 60° C. to 70° C. until the separation of the condensation product ceases. The dyestuff which has been formed is filtered with suction, stirred with hot hydrochloric acid of 3 per cent strength and redissolved in and reprecipitated from dilute sodium carbonate solution.

There is obtained a dyestuff which dyes wool, when after-chromed, blue-green tints of very good fastness to washing, fulling, perspiration and light.

| | Parts |
|---|---|
| (4) 1,5 - dihydroxy - 4,8 - dibrom - anthra - quinone-2,6-disodium-sulfonate | 30 |
| 2-hydroxy - 5 - chloro - 3 - aminobenzoic acid | 29 |
| Calcined sodium carbonate | 10 |
| Cuprous chloride | 1.5 | are together heated to boiling for 8 hours in 250 parts of water, the blue solution obtained is filtered while hot and the product is purified by way of the calcium salt. A dyestuff is obtained which dyes wool, when after-chromed, very fast blue-green tints.

| | Parts |
|---|---|
| (5) 1,5 - dihydroxy - 4,8 - dibrom - anthra-quinone-2,6-disodium-sulfonate | 12 |
| 4'-amino-4-hydroxy-3-methyldiphenyl-methane-5-carboxylic acid | 14 |
| Calcined sodium carbonate | 3 |
| Sodium bicarbonate | 10 |
| Cuprous chloride | 1.2 | are together heated for 24 hours at 80° C. to 85° C. in 500 parts of water. When the condensation is finished, the solution is clarified, the solid matter is precipitated by means of hydrochloric acid and after separation is purified by way of the calcium salt. The dyestuff obtained dyes wool when after-chromed, very fast grey-green tints.

(6) 380 parts of 1-amino-4-brom-anthraquinone-2-sulfonic acid and 300 parts of 4'-amino-4-hydroxy-3-methyl-diphenyl-methane-5-carboxylic acid in water are together dissolved in the form of their sodium salts and the solution is stirred for 24 hours at 60° C. to 65° C. with 170 parts of sodium-bicarbonate and 9 parts of cuprous chloride. The blue dyestuff paste thus formed is taken up in water and acidified with dilute hydrochloric acid. The product which has separated may further be purified in the usual manner. The dyestuff dyes wool clear blue tints which, when after-chromed, become a grey-green of very good properties of fastness.

(7) By performing the condensation reaction of Example 6 with the sodium salt of the 4'-amino-4-hydroxy-2-methyl-diphenyl-methane-5-carboxylic acid, a dyestuff is obtained which is similar to that described in Example 6 and has likewise very good properties of fastness.

(8) By substituting for the amine used in Example 6 the isomeric 4'-amino-2-hydroxy-5-methyldiphenylmethane-3-carboxylic acid, a dyestuff capable of being chromed and having very good properties of fastness is likewise obtained.

| | Parts |
|---|---|
| (9) 1-hydroxy-4-brom-anthraquinone-2-sulfonic acid | 25 |
| 5-amino-2-hydroxybenzoic acid | 15 |
| Calcined sodium carbonate | 20 |
| Cuprous chloride | 2 | are stirred for 20 hours at 60° C. to 70° C. in 350 parts of water. After the usual working up and purification, a violet dyestuff is obtained which dyes wool, when after-chromed, a greenish-grey of very good properties of fastness.

(10) By substituting for the amine, used in Example 9 the equivalent amount of 7-amino-2-hydroxy-3-naphthoic acid there is obtained a product of similarly good properties.

| | Parts |
|---|---|
| (11) 1-amino-4-brom-anthraquinone-2-sulfonic acid | 38 |
| 5-(para-aminobenzoyl)-amino-2-hydroxybenzoic acid | 35 | are condensed in the form of their sodium salts in the usual manner in an aqueous solution in the presence of sodium-bicarbonate and cuprous chloride. A dyestuff is obtained whose dyeings on wool, when after-treated with an agent yielding chromium, have beautiful blue shades of very good properties of fastness.

(12) By condensing 2-hydroxy-3-amino-5-sulfobenzoic acid in an aqueous medium in the presence of sodium carbonate and cuprous chloride with 1-iodoanthraquinone-2-sodium sulfonate a dyestuff is obtained which dyes wool, when after-chromed, brown tints of good properties of fastness.

(13) By condensing 1-bromo-8-amino-anthraquinone-2-sulfonic acid with 2-hydroxy-5-aminobenzoic acid there is obtained in the same manner as described in Example 12 a brown dyestuff capable of being chromed and having good properties of fastness.

(14) 1-iodo-4-brom-anthraquinone-2-sulfonic acid is caused to react with 5-amino-2-hydroxybenzoic acid at a low temperature in an aqueous alkaline medium whereby the iodine atom is exchanged for the amino-hydroxybenzoic acid radical and the bromine atom which stands in 4-position remains unchanged. A red dyestuff is obtained which when after-chromed yields brown tints. By exchanging the bromine atom in the dyestuff for aliphatic or aromatic amino radicals, for instance, such of aniline, dimethylaniline and others, new dyestuffs are obtained which may be after-chromed.

(15) 12 parts of 1-amino-4-brom-anthraquinone-2-sodium-sulfonate, 10 parts of 4-aminodiphenylmethane-4'-hydroxy-3'-carboxylic acid, dissolved in 2.5 parts of sodium carbonate and 80 parts of water, 6 parts of sodium bicarbonate and 0.5 part of cuprous chloride are stirred together for 15 hours at 50° C. to 60° C. When the condensation is finished, the dyestuff formed is isolated by acidifying the solution and purified by reprecipitating it from a sodium carbonate solution. An acid solution of the dyestuff dyes wool clear blue tints which when treated with agents yielding chromium become blue-green of very good properties of fastness.

(16) 24 parts of 1-amino-4-brom-anthraquinone-2-sodium-sulfonate and 24 parts of (3'-aminobenzyl-4-amino)-2-carboxyphenol are together heated at 50° C. to 60° C. with 8 parts of calcined sodium carbonate and 1 part of cuprous chloride in 100 parts of water until the condensation is finished. The dyestuff which is isolated and purified in the usual manner dyes wool blue tints which, when after-chromed, become bluish-grey of very good properties of fastness.

(17) By substituting for the base used in Example 16 the corresponding (4'-aminobenzyl-4-amino)-2-carboxyphenol there is obtained a dyestuff which has properties similar to those of the dyestuff described in Example 16 and yields likewise a grey of very good fastness.

(18) 36 parts of 1-amino-4-brom-anthraquinone-2-sodium-sulfonate, 45 parts of (2'-amino)-benzyl-(4-hydroxy-3-methyl)-phenylsulfone-5-carboxylic acid of the formula

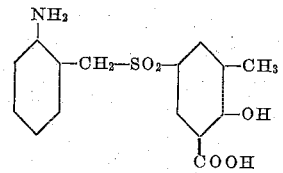

21 parts of calcined sodium carbonate, and 1.5 parts of cuprous chloride are together heated at 90° C. in 450 parts of water until the reaction is finished. After isolation and purification, a dyestuff is obtained which dyes wool reddish-blue tints. By after-chroming the acid dyeing, a navy-blue of very good properties of fastness is obtained.

(19) A mixture of 12 parts of 1-amino-4-brom-anthraquinone-2-sodium-sulfonate, 15 parts of (3'-amino-4'-methyoxy)-benzyl-(4-hydroxy-3-methyl)-phenylsulfone-5-carboxylic acid of the formula

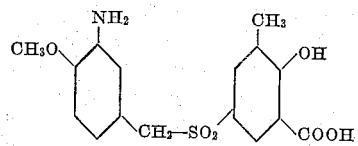

7 parts of calcined sodium carbonate and 1 part of cuprous chloride and 150 parts of water is boiled for about 5 hours.

The dyestuff formed is isolated and purified; it dyes wool blue tints which, when after-chromed, assume a greenish shade and are essentially enhanced in their properties of fastness.

By substituting for the base of the above formula that of the formula

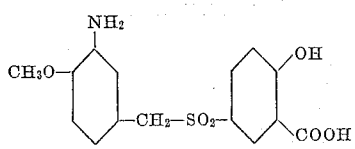

there is obtained a dyestuff of similar properties.

(20) 11 parts of 1-iodo-anthraquinone-2-sodium-sulfonate, 7 parts of 3-hydroxy-6-amino-2-naphthoic acid, 3 parts of calcined sodium carbonate, and 0.3 part of cuprous chloride are together stirred for 4 hours at 30° C. in 50 parts of water. After the usual working up a brown dyestuff is obtained which dyes wool, when after-chromed, fast brown tints.

(21) By causing the bromine atom in 4-position of 1-amino-2.4-dibromanthraquinone to react with 4 - amino - 2'-hydroxy-5' - methyldiphenylmethane-3'-carboxylic acid by heating the components in the presence of anhydrous potassium acetate, copper acetate and copper bronze amyl alcohol being used as solvent, there is obtained the 1-amino-2-brom-anthraquinone-4-(para-aminodiphenylmethane - 2'-hydroxy-5'-methyl-3'-carboxylic acid) of the formula

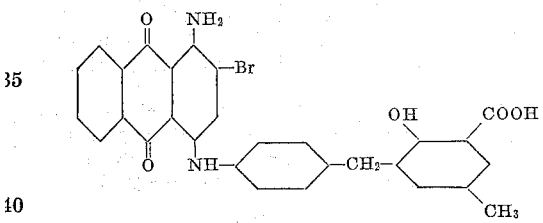

45 parts of this product are mixed with 180 parts of phenol, 36 parts of potassium sulfite and 100 parts of water and the whole is heated to boiling until the product has become easily soluble in water. After removing the phenol by steam distillation, the dyestuff sulfonic acid formed is isolated in the usual manner. It is identical with the condensation product described in Example 8.

(22) 30 parts of 4-amino-2-chloro-4'-hydroxy-3'-carboxydiphenyl-urea are heated at 80° C. for 24 hours with 30 parts of calcined sodium carbonate, 30 parts of sodium 1-amino-4-brom-anthraquinone-2-sulfonate, 1 part of cuprous chloride and 350 parts of water. The blue solution obtained is mixed with dilute hydrochloric acid until the condensation product has precipitated. In order to purify the dyestuff so obtained, it is reprecipitated from a dilute ammoniacal solution by acidification. If necessary, the last operation is repeated. After drying a dark blue powder is obtained which dyes wool from an acid solution blue tints which, when after-chromed, become a blue-grey of very good properties of fastness.

(23) 20 parts of sodium-1-amino-4-bromanthraquinone-2-sulfonate, 23 parts of 4-chloro-3-aminobenzyl - 4' - hydroxy - 3'-carboxy-phenyl-sulfone, 17 parts of calcined sodium carbonate and 1 part of cuprous chloride are heated in 250 parts of water, while stirring, at 80° C. to 90° C. until the formation of the dyestuff is finished. The blue solution so obtained is filtered and diluted with 15 times its weight of water, the dyestuff is precipitated by addition of dilute hydrochloric acid and isolated by filtration. The filter cake is well washed with hydrochloric acid of 3 per cent strength and the product thus treated is further purified by dissolving it in dilute ammonia and acidifying with dilute hydrochloric acid. A dark crystalline powder is obtained which dissolves in water to a blue solution and dyes wool in an acid bath beautiful blue tints which, when after-chromed become a greenish blue of very good properties of fastness.

(24) 16 parts of 1-amino-4-bromanthraquinone-2-sodium-sulfonate, 13 parts of 4-amino-4'-hydroxy-azobenzene-3'-carboxylic acid, 10 parts of calcined sodium carbonate and 1 part of cuprous chloride are heated in 250 parts of water to boiling until the reaction is finished. The reaction product is acidified with dilute hydrochloric acid, the whole is heated at 80° C. for a short time, filtered with suction and the filter cake is washed with dilute hydrochloric acid. On dissolving it in a dilute solution of sodium carbonate or ammonia a green solution is obtained, from which the dyestuff is isolated by salting out. The product dyes wool from an acid bath green tints whose properties of fastness are enhanced by after-chroming.

(25) 16 parts of 5-amino-2-hydroxybenzoic acid are dissolved in 100 parts of water with addition of 10 parts of sodium carbonate. To this solution there are added 19 parts of sodium 1.4-dichloranthraquinone-6-sulfonate, 9 parts of sodium bicarbonate, 150 parts by volume of methanol and 1 part of cuprous chloride. After stirring for 30 hours at 70° C., the reaction mixture is diluted with 1000 parts of hot water, filtered with suction and the residue remaining on the filter is washed with hot water. The residue is dissolved in hot dilute sodium carbonate solution and the dyestuff is precipitated by acidifying with dilute hydrochloric acid. By several repetitions of these operations the dyestuff is obtained in a pure form. It dyes wool in an acid bath beautiful green tints which, when after-chromed, become a greenish grey of very good properties of fastness.

On working up the mother liquors obtained by the first filtration there may be isolated a dyestuff yielding violet tints in which only one chlorine atom has been replaced by the aminosalicylic acid radical. The product dyes wool from an acid bath violet tints which, when after-chromed, become a grey-brown.

(26) 20 parts of 1 - amino- 4 - bromanthraquinone-2-sodium sulfonate, 22 parts of 3-amino-6-methoxybenzyl-4'-hydroxy - 3' - carboxy-phenyl-sulfone, 17 parts of calcined sodium carbonate and 1 part of cuprous chloride are heated in 200 parts of water, while stirring, at 80° to 90° C. for 15 hours. The solution becomes an intensive blue already after only a short time. After cooling, it is introduced, while stirring, into 1500 parts by volume of sodium chloride solution of 10 per cent strength, the separated dyestuff is filtered and washed with a sodium chloride solution of 10 per cent strength. The filter cake is then dissolved in about 6000 parts of water with addition of a small quantity of sodium carbonate, while heating, and the blue solution obtained is filtered and acidified with dilute hydrochloric acid. The dyestuff thus precipitated may be purified, if necessary, by dissolving it in dilute aqueous ammonia and reprecipitating it with hydrochloric acid. A dark blue powder is obtained which dyes wool in an acid bath clear blue tints, which are essentially enhanced in their properties of fastness by treatment with agents yielding chromium.

(27) 40 parts of 1-amino-4-bromanthraquinone-2-sodium-sulfonate, 40 parts of the compound of the formula

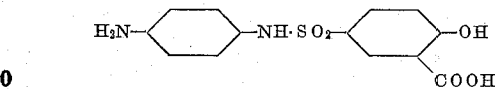

18 parts of calcined sodium carbonate, 10 parts of sodium bicarbonate and 2 parts of cuprous chloride are heated in 400 parts of water, while stirring, at 70° C. to 80° C. until the formation of the dyestuff is finished. After working up the reaction mixture in the usual manner a dyestuff is obtained which dyes wool in an acid bath grey-blue tints which, when after-chromed, become a greenish grey of good properties of fastness.

(28) From 40 parts of 1-amino-4-bromanthraquinone-2-sodium sulfonate, 42 parts of 2-amino-5-sulfo-diphenylamine-4'-hydroxy-3'-carboxylic acid, 30 parts of sodium carbonate, 2 parts of cuprous chloride and 400 parts of water there is obtained in a similar manner a dyestuff dyeing wool from an acid bath blue tints which, when after-chromed, become a grey of good properties of fastness.

We claim:

1. The members of the group consisting of the compounds of the general formula

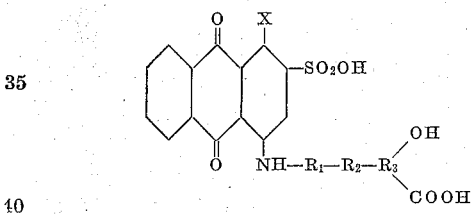

wherein X means a member of the group consisting of amino and hydroxy and
$R_1$ means an aryl radical of the benzene series, $R_2$ means a radical of the group consisting of —$CH_2$—, —NH—, —N=N—, —$CH_2$NH—, —CONH—, —NHCONH—, —$CH_2SO_2$— and —$SO_2.NH$— and $R_3$ means an aryl radical of the benzene series wherein the hydroxy and carboxy groups of the formula stand in orthopositions to each other, and the alkali metal salts of these compounds, being dyestuffs capable of being chromed.

2. The members of the group consisting of the compound of the formula

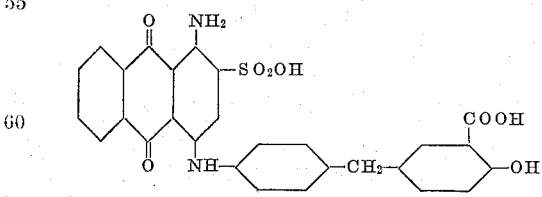

and the alkali metal salts thereof, which in an acid solution dye wool clear blue tints which when treated with agents yielding chromium become blue-green of very good properties of fastness.

3. The members of the group consisting of the compound of the formula

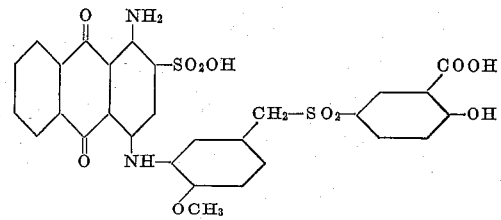

and the alkali metal salts thereof, dyeing wool blue tints which, when after chromed, assume a greenish shade and are essentially enhanced in their properties of fastness.

4. The members of the group consisting of the compound of the formula

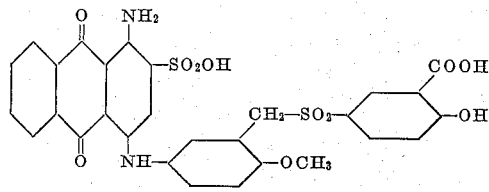

and the alkali metal salts thereof, which in an acid solution dye wool clear blue tints which when treated with agents yielding chromium are essentially enhanced in their properties of fastness.

5. The members of the group consisting of anthraquinone compounds which contain in a beta position of the anthraquinone molecule a sulfonic acid group and in an alpha position an

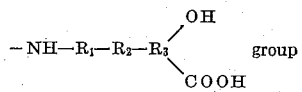 group wherein $R_1$ means an aryl radical of the benzene series, $R_2$ means a radical of the group consisting of —$CH_2$—, —NH—, —N=N—, —$CH_2.NH$—, —CO.NH—, —NH.CO.NH—, —$CH_2.SO_2$— and —$SO_2.NH$— and $R_3$ means an aryl radical of the benzene series wherein the hydroxy and carboxy groups of the formula stand in ortho position to each other, and the alkali metal salts of these compounds, being dyestuffs capable of being chromed.

GEORG KRÄNZLEIN.
ERNST DIEFENBACH.
ERICH FISCHER.
ERNST HONOLD.
FRITZ EGGERT.
HELMUT KRAUSS.